Sept. 2, 1958    E. KRAMP ET AL    2,850,423
MANUFACTURE OF FLOOR MAT
Filed Dec. 2, 1954

INVENTOR.
EDWARD KRAMP
BY ALFRED J. LOWDERMILK, JR

*R. L. Miller*
ATTORNEY

United States Patent Office 2,850,423
Patented Sept. 2, 1958

2,850,423

MANUFACTURE OF FLOOR MAT

Edward Kramp, Akron, and Alfred J. Lowdermilk, Jr., Cuyahoga Falls, Ohio, assignors to The Goodyear Tire & Rubber Company, Akron, Ohio, a corporation of Ohio Application December 2, 1954, Serial No. 472,716

3 Claims. (Cl. 154—127)

This invention relates generally to a laminated mat and the method of making the same and more particularly to a mat formed of a base sheet of elastomeric material with a film of a vinyl resin bonded thereto.

A strong trend has been evident in recent times to color schemes of bright and vivid colors, especially in such consumer goods as automobiles. Whereas in former years automobile interiors were more or less standardized in such colors as grey, brown, etc., today, interiors of colors such as red, yellow, green, or blue are not uncommon. While such vivid and appealing colors may be achieved without excessive difficulty in metal finishes and upholstery materials, the problem of obtaining matching colors in items such as floor coverings has been aggravating. The mats utilized for such usage have almost without exception been formed of vulcanizable elastomeric materials such as rubber and have consequently been limited in color to black. Utilization of materials such as vinyl resins for the entire floor mat has been impractical from the standpoint of cost. Finishes such as paints have been attempted but are impractical in view of the rough usage and constant abrasion to which these mats are subjected. As a consequence, and in an attempt to compromise from the standpoint of costs, thermoplastic materials such as vinyl resins have been sprayed in globules over the mat base prior to the molding operation. However, many difficulties and problems arise in this type of manufacturing process also.

It is the general object of this invention to provide a mat having a wide range of vivid and decorative surface colors.

A further object of this invention is to provide a mat demanding a minimum of maintenance and presenting in use a color-fast, extremely durable and wearable surface.

A still further object of this invention is to provide a method of making a mat having the qualities previously enumerated utilizing standard molding equipment heretofore utilized in the art without extensive and costly alteration thereto and which method is simple, efficient, and economical in operation.

The aforesaid objects of the invention, and other objects which will become apparent as the description proceeds, are achieved by the bonding prior to the molding operation of a base sheet of vulcanizable elastomeric material to a thin film of thermoplastic material such as vinyl halide resins perforated with minute and substantially inconspicuous openings therethrough.

The product of the invention and the method of making the same has been made possible by the development of a means of perforating thin films of thermoplastic material with minute and substantially inconspicuous openings therethrough by means of the method and apparatus of the copending application of H. D. Kiplinger, Serial No. 365,963, filed July 3, 1953, now abandoned. Heretofore it has been considered impractical to surface elastomeric base sheets with thin films of thermoplastic material; especially in applications where mats of large areas are desired. The difficulty in applying a solid film to such base sheets has been in the main centered in the impermeability of the surfacing film to gases evolved prior to and during the molding operation. These gases are formed internally of the base sheet with the application of heat and pressure thereto, and, where utilized, from the vaporization of solvents incorporated in adhesives bonding the film to the base sheet. Such gases and vapors, when afforded no means of escape, collect between the two layers and result in unsightly and unacceptable blisters and wrinkles in the finished molded product. While in production runs, one or two percent of the issuing mats will be acceptable, the remainder must be rejected; and in view of the nature of the incompatibility of the laminate structure, salvage and subsequent re-use of the scrap is unsatisfactory. Such a reject rate is, to say the least, totally impractical from a cost standpoint of the final product.

The availability now of a film of thermoplastic material perforated with minute and substantially inconspicuous openings has resulted in a practical solution to the laminate vapor venting problem by the method of the invention and in a mat possessing all the desirable, and heretofore unattained, characteristics of thermoplastic films such as smooth continuous surfaces, color-fastness, etc.

Figure 1:
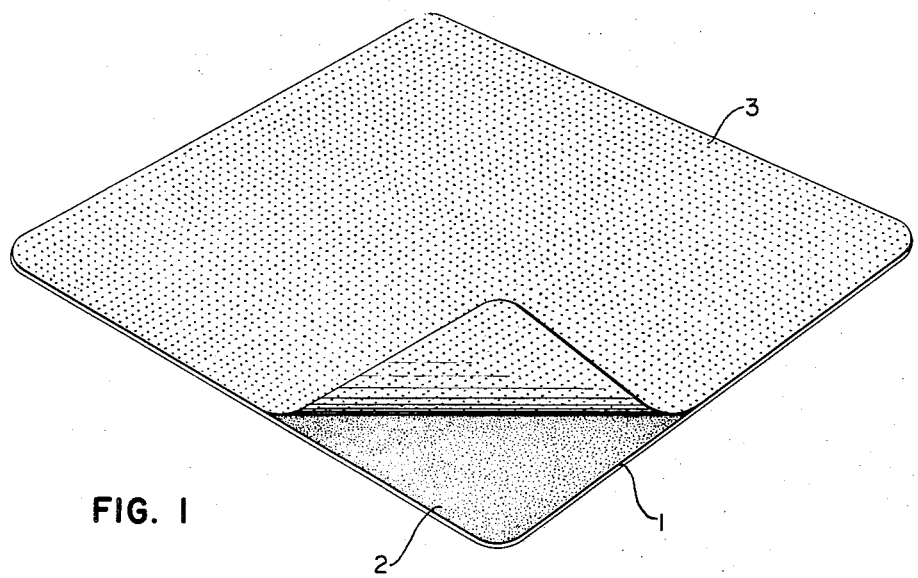
Fig. 1 is a view of the mat of the invention prior to the molding operation.

Referring now more particularly to the annexed drawings and especially to Fig. 1 thereof, the numeral 1 represents a base sheet of vulcanizable elastomeric material such as rubber in the uncured state prior to the molding operation. The base sheet 1 is generally prepared by methods well known in the art to a prescribed size and configuration dependent on the intended application of the final finished mat. In the method of the invention, a layer of adhesive 2 is applied to the surface of the base sheet 1, and a film 3 of thermoplastic material such as a polyvinyl chloride film is placed thereupon. The film 3 is perforated therethrough with minute and substantially inconspicuous openings 4, which, in this, the assembly step of the method of the invention, act so as to vent any entrapped air between the film 3 and the base sheet 1 as a result of the placement together of the two. The resulting laminate is now in readiness for the molding operation, the apparatus for which will not be further described herein, being well known to those skilled in the art and forming no part of this invention.

During the interval between completion of the laminate sandwich and the molding operation, the perforations 4 further serve to vent vaporized solvent formed in the continuing drying of the adhesive layer 2. It may be especially desirable to "age" the laminate at this stage for a time interval from 12 to 24 hours; particularly where mats having sharply contoured configurations are desired. This "aging" interval permits further evaporation and drying of the adhesive, thereby lessening chances of "film-breakthrough" due to the action of the solvent vapors on the film. By "film-breakthrough" is meant the rupture of the film layer permitting the flow of the base sheet material therethrough.

Figure 2:
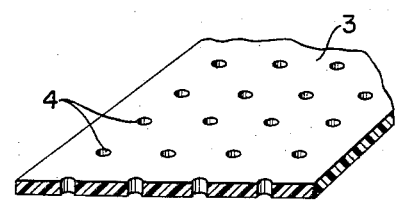
Fig. 2 is a fragmentary view of the perforated film of thermoplastic material utilized as a surfacing material.

Fig. 2 is a fragmentary view of the film 3 and shows in enlarged and exaggerated form the perforations 4. In the practice of the invention, a polyvinyl chloride film is preferred, with a thickness of from 0.003" to 0.008" and perforations of a mean diameter substantially in the order of 0.002 inch to 0.040 inch. The perforations 4 are preferred to be of a regularity in dimension and shape; mere ruptures of the film being unsatisfactory as tending to result in "bleeding" of the base sheet 1 through such ruptures to smear and discolor the appearance of the exterior surface of the film 3. Preferably these perforations are close together in a density distribution in the order of from 20 to 80 openings per square inch, so that the solvent gases and vapors have only a short path to travel to exit from between the layers.

While two ancillary functions of the perforations 4 in the film 3 have been previously discussed, namely: to aid in venting entrapped air in the assembly of the laminate, and to aid in the subsequent escape of vapors evolved in the curing up of the solvent, the main function of the perforations 4 remains to be described. In the molding operation, heat and pressure are utilized to force the film surface of the laminate against a mold matrix and effect a cure or vulcanization of the base sheet 1. It is in this procedure that a substantial amount of gases and vapors evolve and must be vented properly or else the final product will be unacceptable and marred by numerous blisters between the two layers. And it is here that the perforations 4 perform their main function: venting of such vapors and gases and preventing the formation of such blister pockets. The final resulting product by the method of the invention is one wherein the film 3 presents an attractive and unblemished appearance.

Figure 3:
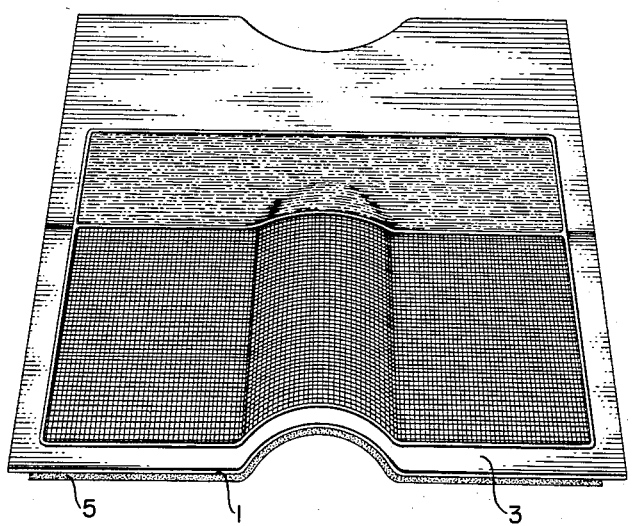
Fig. 3 is a view of an embodiment of the invention; namely, an automobile floor mat.

Fig. 3 shows one form of a finished molded mat embodying the features of the invention; specifically an automobile floor mat. The laminations forming the mat are shown in exaggerated perspective for purposes of clarity and ease of interpretation. The main portion of the mat is made up of the base sheet 1 and the film 3. A cushioning sheet 5 of suitable material may be adhesively applied to the under surface of the mat.

The adhesive layer 2 of Fig. 1 may be of any suitable composition. A butadiene-acrylonitrile synthetic rubber cement works very effectively.

Another facet of the invention is in the manufacture of small "palm-size" mats. While it may be feasible to produce such mats utilizing unperforated film by virtue of the ease of side venting such small surface areas; however, by the method of the invention it is now possible, in one operation, to mold a large sheet incorporating a considerable number of such small mats and subsequently to cut therefrom the smaller mats desired, thus affording a considerable reduction of labor and costs thereby.

It will now be apparent that the method of the invention has resulted in a product that completely meets the objects of the invention. Wear tests have shown the final product to have wear resistant properties far beyond those heretofore attainable. With a perforated polyvinyl chloride film of 0.003" thickness, such properties are increased 1500%. Weather fastness and durability, fading characteristics, ease of maintenance and cleanability all shown marked improvement.

A still further advantage is achieved due to the increase in overall strength through the addition of the film layer. Base sheets may be reduced in thickness up to as high as 55% over that of the thickness of the base sheet material when utilized as a mat without a film surface.

In the description and claims, the term "vinyl halide resin" is employed in the usual sense to mean a polyvinyl halide, such as polyvinyl chloride, and copolymers of a major proportion of a vinyl halide, such as vinyl chloride, and a minor proportion of another monomer copolymerizable therewith, such as vinylidene chloride, vinyl acetate, diethyl maleate, dibutyl maleate, diethyl fumarate and the like. This is a well-recognized class of materials.

Any elastomeric material may be used for the base sheet; in practice a vulcanizable elastomeric material, such as natural rubber or synthetic rubber, including reclaim rubber, is preferred.

While certain representative embodiments and details have been shown for the purpose of illustrating the invention, will be apparent to those skilled in this art that various changes and modifications may be made therein without departing from the spirit or scope of the invention.

We claim:
1. A process for the manufacture of floor mats having a decorative surface thereon, comprising the steps of applying a substantially continuous layer of an adhesive to one side of a substantially air-impervious sheet of vulcanizable elastomeric material, placing a continuous film of vinyl halide resin of a thickness in the order of .003" to .008" and having a multiplicity of minute and substantially inconspicuous openings therethrough upon the adhesively coated surface of said sheet to form a laminated structure, placing the film surface of the laminated structure against a forming mold, and subjecting the laminated structure to heat and pressure to simultaneously vulcanize the elastomeric material and to inseparably unite with the film and form the mat with the film being the decorative surface thereof.

2. A process for the manufacture of floor mats having a decorative surface thereon, comprising the steps of applying a substantially continuous layer of an adhesive to one side of a substantially air-impervious sheet of vulcanizable material, thereafter placing a continuous film of vinyl halide resin of a thickness in the order of .003" to .008" perforated with openings therethrough of a mean diameter substantially in the order of 0.002" to .40" and in a density distribution in the order of 20 to 80 openings per square inch upon the adhesively coated surface of said sheet to form a laminated structure, placing the film surface of the laminated structure against a forming mold, and subjecting the laminated structure to heat and pressure to simultaneously vulcanize the elastomeric material and to inseparably unite with the film and form the mat with the film being the decorative surface thereof.

3. A process for the manufacture of floor mats having a decorative surface thereon, comprising the steps of applying a substantially continuous layer of an adhesive containing a solvent therein to one side of a substantially air-impervious sheet of vulcanizable elastomeric material, evaporating a portion of the solvent in said adhesive to cause the adhesive to reach a tacky condition, thereafter placing a continuous film of polyvinyl chloride of a thickness in the order of .003" to .008" perforated with openings therethrough of a mean diameter substantially in the order of .002" to .040" and in a density distribution in the order of 20 to 80 openings per square inch upon the adhesively coated surface of said sheet to form a laminated structure, placing the film surface of the laminated structure against a forming mold, and subjecting the laminated structure to heat and pressure to simultaneously vulcanize the elastomeric material and inseparably unite with the film and form the mat with the film being the decorative surface thereof.

References Cited in the file of this patent

UNITED STATES PATENTS

| Number | Name | Date |
| --- | --- | --- |
| 1,403,143 | Atwood | Jan. 10, 1922 |
| 1,957,732 | Rowe | May 8, 1934 |
| 1,999,280 | Cavanagh | Apr. 30, 1935 |
| 2,082,047 | Bronson | June 1, 1937 |
| 2,083,865 | Rensink | June 15, 1937 |
| 2,198,008 | Iknayan | Apr. 23, 1940 |
| 2,352,705 | Garvey et al. | July 4, 1944 |
| 2,572,877 | Morris et al. | Oct. 30, 1951 |
| 2,626,886 | Scholl | Jan. 27, 1953 |
| 2,646,797 | Scholl | July 28, 1953 |
| 2,732,324 | Morris | Jan. 24, 1956 |

UNITED STATES PATENT OFFICE
CERTIFICATE OF CORRECTION

Patent No. 2,850,423                                            September 2, 1958

Edward Kramp et al

It is hereby certified that error appears in the printed specification of the above numbered patent requiring correction and that the said Letters Patent should read as corrected below.

Column 3, line 60, for "shown" read -- show --; column 4, line 6, before "will" insert the word "it"; line 34, for ".40" " read -- .040" --.

Signed and sealed this 11th day of November 1958.

(SEAL)
Attest:

KARL H. AXLINE                                                      ROBERT C. WATSON
Attesting Officer                                            Commissioner of Patents